April 21, 1925.
H. MEHNER
1,535,026
PROCESS FOR THE PRODUCTION OF ZINC IN REVERBERATORY FURNACES
Filed Nov. 4, 1922
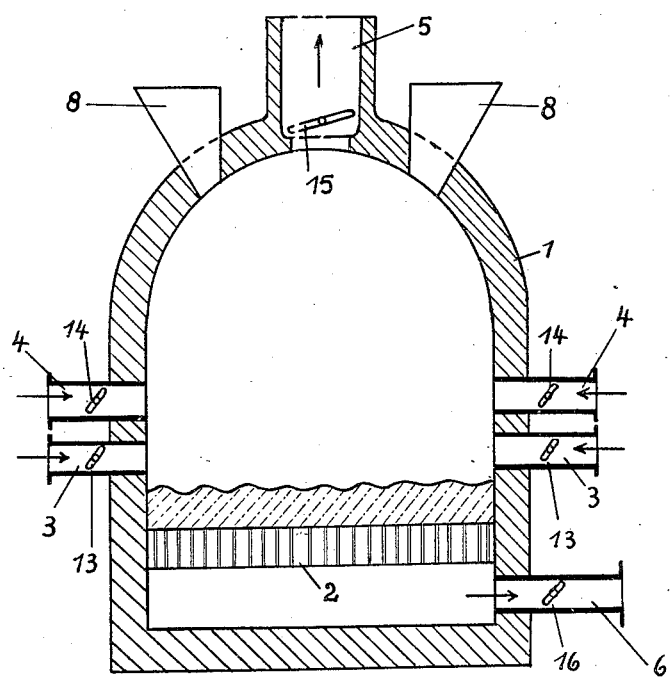

Patented Apr. 21, 1925.

1,535,026

UNITED STATES PATENT OFFICE.

HERMANN MEHNER, OF BERLIN-CHARLOTTENBURG, GERMANY.

PROCESS FOR THE PRODUCTION OF ZINC IN REVERBERATORY FURNACES.

Application filed November 4, 1922. Serial No. 599,130.

*To all whom it may concern:*

Be it known that I, HERMANN MEHNER, a citizen of the German Republic, residing at Berlin - Charlottenburg, Schlosstrasse 66, Germany, have invented certain new and useful Improvements in Processes for the Production of Zinc in Reverberatory Furnaces, of which the following is a specification.

My invention relates to a process for the production of zinc by use of a gas heated in a furnace with a flame acting as source of heat above the charge. According to my invention the charge in the flame furnace is heated from above, the reduction gases and vapours produced at a suitable temperature, of about 1000° C., they being conducted downwardly through the charge of ore which is placed upon the bed of the hearth.

The combustion chamber of the furnace can be regarded as a receiver into which gas and air for combustion are admitted through valved inlet openings, whilst the fire gases are initially discharged through a flue or chimney having a damper, to provide for the discharge of products of combustion on starting and maintaining heating of the combustion chamber of the furnace. For the production of zinc according to my process, an exit is provided for the reduction gases through the charge of ore, which is preferably deposited from hoppers upon a pervious hearth of the furnace. A chamber is located below the hearth, said chamber being provided with a valved outlet pipe which leads to a condenser, not shown. The fire gases pass eventually through the charge produce zinc vapour immediately upon entering said charge. In operation the proportional carbon dioxide content is lowered by the accession of the carbon monoxide and hydrocarbons formed in the reduction furnace. A further very important feature is that the carbon dioxide itself is reduced at the high temperature, by the excess of carbon in the charge, to such an extent that the small residuum of carbon dioxide cannot form zinc oxide, that is to say the reduction of the $CO_2$ is practically complete. The reduced portion of the fire gases are then passed, together with the gases from the reduction of the charge, into the condensing plant.

The separation of the zinc vapor from the charge of metallic zinc ore, placed upon the hearth is effected in proportion to the amount of fire gases in the reduction gases is smaller. The furnace manager should therefore endeavour to lower the pressure of the fire gases to the utmost possible minimum in the chamber below the charge and the hearth, so that, as far as possible only the reduction gases pass through the bed of the furnace, and without allowing the reduction gases to find their way out of the combustion chamber. To ascertain and maintain the proper pressure in the combustion chamber of furnace, by the absence of greenish white flame of zinc flames or fumes above the charge and by analysis of the products in the chamber below the hearth. The means for regulating the pressure comprises valves in the four inlets to the combustion chamber of the furnace. For example, the pressure in the combustion chamber might be equivalent to 100 millimetres and at the same time with practically no pressure at all in the chimney. The pressure in the admission passages for the heating gases and the combustion air may be a little higher than 100 millimetres and the valves in the two gas and air passages would be set to give the requisite heat and pressure to produce oxidizing combustion. All that is needed in addition is to keep the pressure below the furnace hearth lower than the pressure in the combustion chamber. The pressure beneath the hearth must be chosen in accordance with the resistance offered by the charge of ore and the hearth to the gases passing therethrough varying with the depth and the compactness of the charge lying on the hearth to insure that a slightly larger amount of gas passes through the bed of ore and through the hearth of the furnace than is generated in the combustion chamber of the furnace.

In order to lead the reduction gases downwards, the hearth may have the form of a grate, grid-like openings being provided or perforated bricks may be used. In many cases it is sufficient that the hearth is porous and it is then possible, by arranging for suitable differences in pressure between the furnace chamber and the chamber below the bed of the hearth, to lead the gases in a downward direction. The type of construction chosen depends upon circumstances. A smooth hearth of porous, that is ordinary, bricks, is very cheap. It also prevents even a fine dust-like charge from falling through. A hearth of ordinary bricks may become clogged with slag if the charge forms easily fusible compounds, in which event the grate-type of hearth will be necessary. Perforated bricks constitute an intermediate stage between the grate and the smooth brick types and offer less resistance to gas than smooth bricks. Which arrangement is the most advantageous, will depend on the character of the ore and gas used.

With such a process a considerable extension can be given to the dimensions of the flame furnace. The hearth may be covered with the charge to a suitable depth by mechanical means and the finished charge may be mechanically ejected in the manner adopted with coke ovens.

The process of the present invention may be carried out in flame furnaces of various types, so long as provision is made for carrying away the volatile part of the reduction products from the charge of ore and through the hearth.

The accompanying drawing shows by way of example a vertical section a furnace suitable for carrying out my process. The furnace consists of an arched chamber 1 having a pervious hearth 2 in its lower part upon which the charge such as zinc ores is deposited. Beneath the hearth 2 there is a space which is in communication with an exhaust pipe 6 having a valve 16. Passages 3 serve for the introduction of heating gases, and air is introduced through the channels 4, having dampers 14. The roof of the arch 1 is equipped with charging hoppers 8. The burnt gases escape through the chimney 5 when the throttling damper 15 is set to open position. The area of the gas and air admission channels 3 and 4 can be controlled by the valves 13 and 14 respectively. The pervious hearth 2 is of a pervious character and may be of porous or perforated bricks set to provide between them narrow channels or vertical spaces. The valves 13, 14, 15 and 16 are adjusted so that, as far as possible, only the reduction gases are drawn through the pervious hearth into the chamber below the hearth and are passed therefrom through the exhaust pipe 6 having a damper 16 the reduction gases along with zinc vapor to a condenser, not shown in the drawing.

I claim:

1. In the recovery of zinc from ore, the process which comprises heating a mixture of zinc ore and fuel by burning fuel above a bed of such mixture, a controlled amount of the heated products of combustion being led away from the mixture and the remaining heated products of combustion being passed through the mixture of ore and fuel to reduce and volatilize the zinc.

2. In the recovery of zinc from ore, the process which comprises heating a mixture of zinc ore and fuel by burning gaseous fuel above a bed of said mixture, a controlled amount of the combustion gases being led off and away from said mixture while the heat therefrom is by contact heating the upper surface of said mixture, and creating a draft downward through the mixture of ore and fuel to reduce and volatilize the zinc.

In testimony whereof I have affixed my signature in presence of two witnesses.

HERMANN MEHNER.

Witnesses:
ELEMENS CLEMENTE,
WERNDT KRENY.